United States Patent [19]

Gillotte

[11] Patent Number: 5,424,858
[45] Date of Patent: Jun. 13, 1995

[54] APPARATUS FOR LOCATING FILE FOLDERS

[75] Inventor: Robert P. Gillotte, Columbia, S.C.

[73] Assignee: Or-An Company International, Inc., Columbia, S.C.

[21] Appl. No.: 115,622

[22] Filed: Sep. 3, 1993

[51] Int. Cl.[6] .......................................... H04B 10/00
[52] U.S. Cl. .................................... 359/143; 359/158; 340/825.36; 340/825.54
[58] Field of Search ....................... 359/143–144, 359/154, 158, 165, 168, 184, 163, 171–172; 340/572, 825.36, 825.49, 825.54, 825.69, 825.72, 505, 568, 825.14

[56] References Cited

U.S. PATENT DOCUMENTS

| Re. 33,054 | 9/1989 | Markham | 235/385 |
|---|---|---|---|
| 3,451,043 | 6/1969 | Krause | 340/152 |
| 4,369,361 | 1/1983 | Swartz et al. | 235/470 |
| 4,392,132 | 7/1983 | Derks | 340/825.14 |
| 4,567,356 | 1/1986 | Signoretto | 235/375 |
| 4,588,881 | 5/1986 | Pejas et al. | 235/385 |
| 4,636,950 | 1/1987 | Caswell et al. | 364/403 |
| 4,642,459 | 2/1987 | Caswell et al. | 250/227 |
| 4,814,742 | 3/1989 | Morita et al. | 319/144 |
| 5,063,380 | 11/1991 | Wakura | 340/825.54 |
| 5,159,180 | 10/1992 | Feiler | 235/375 |

Primary Examiner—David K. Moore
Assistant Examiner—Kinfe-Michael Negash
Attorney, Agent, or Firm—Fulbright & Jaworski

[57] ABSTRACT

A portable electromagnetic transmitter providing varied selected coded outputs for selectively actuating a selected receiver among a plurality of folders each provided with a receiver. The receiver provides an output signal locating the file. Shelves holding the file folders may include electrical power conductors for energizing the receivers.

7 Claims, 4 Drawing Sheets

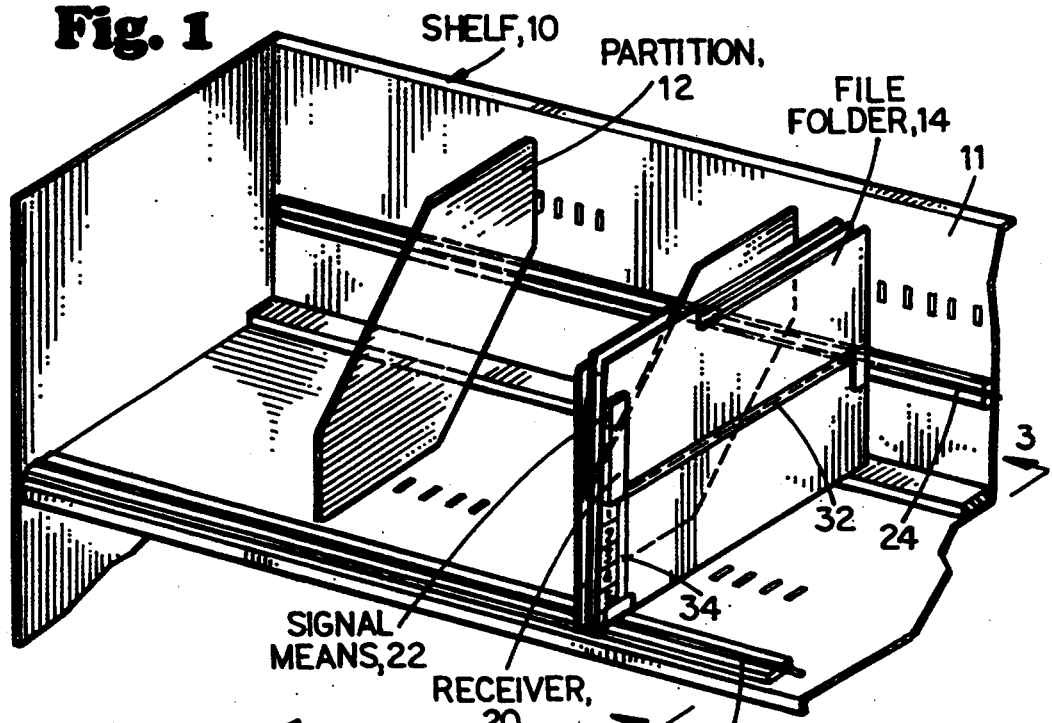
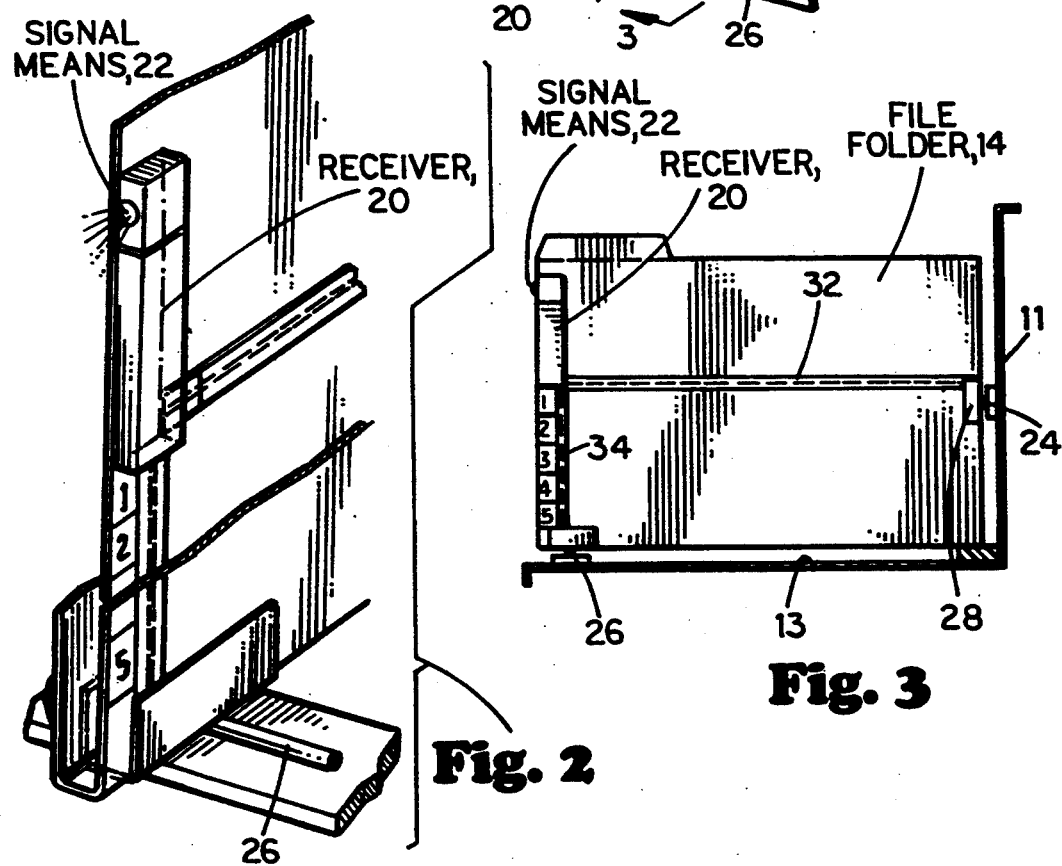
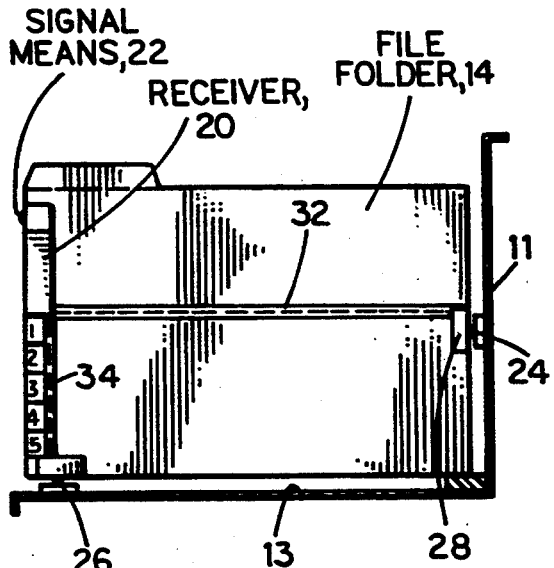

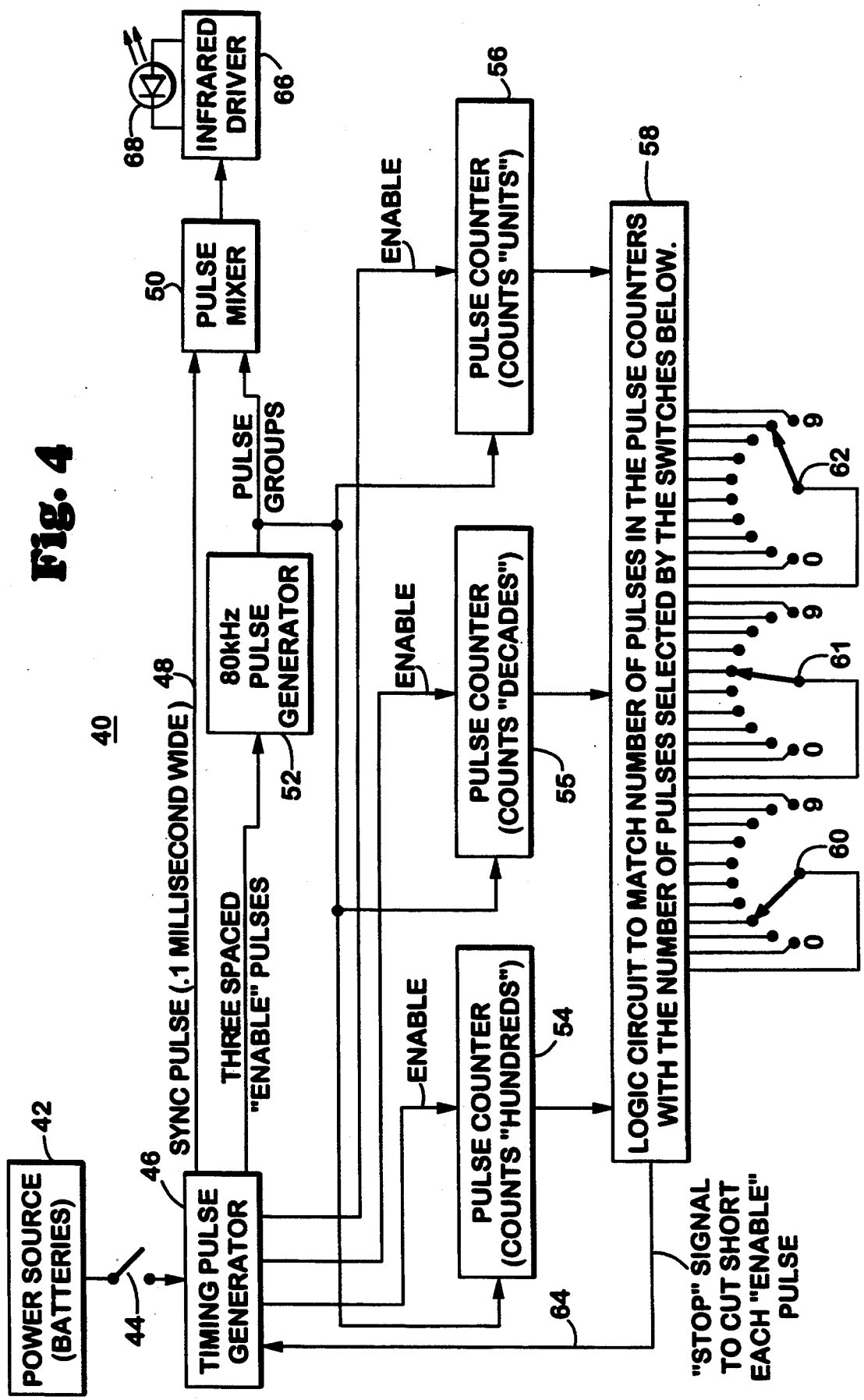

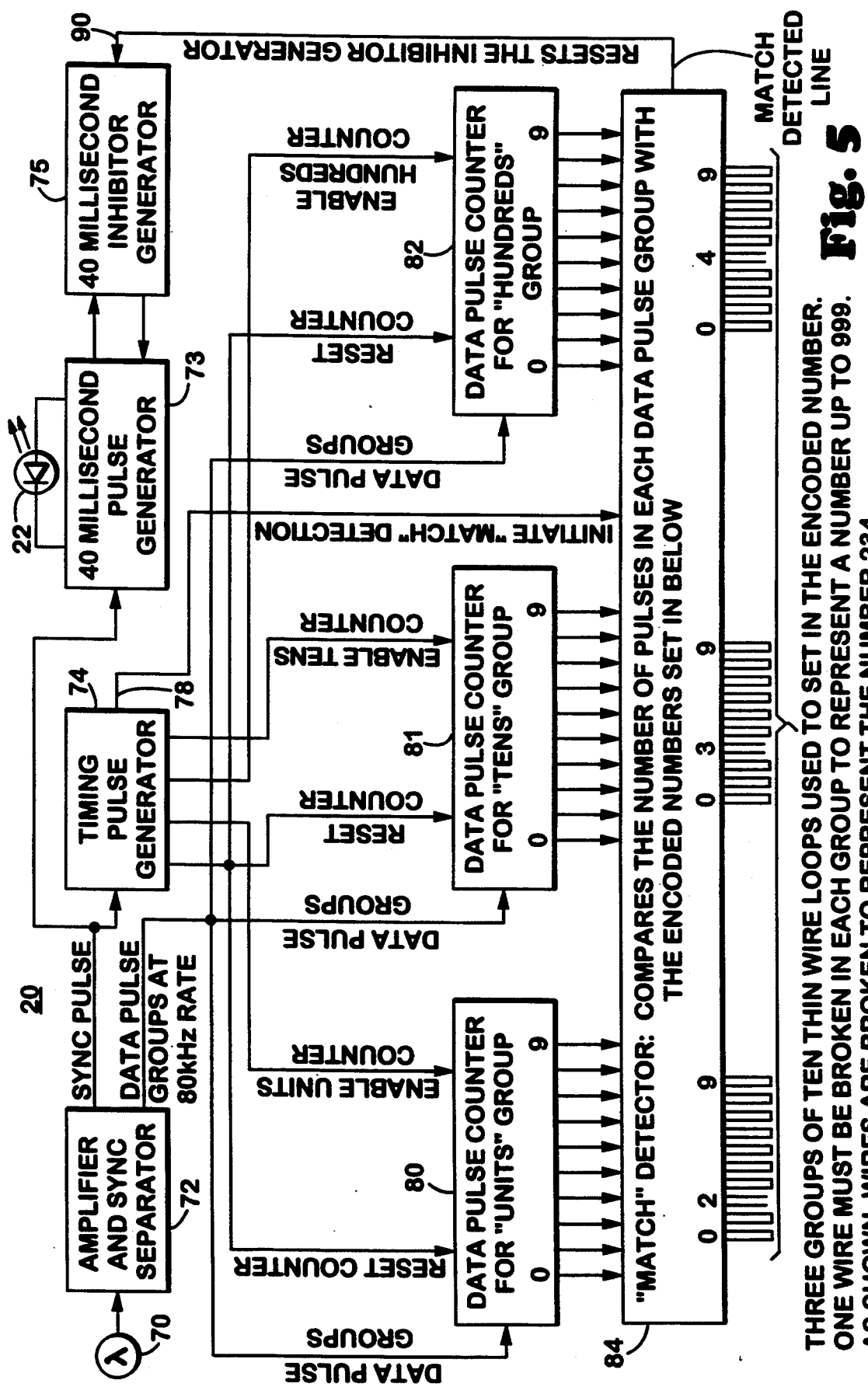

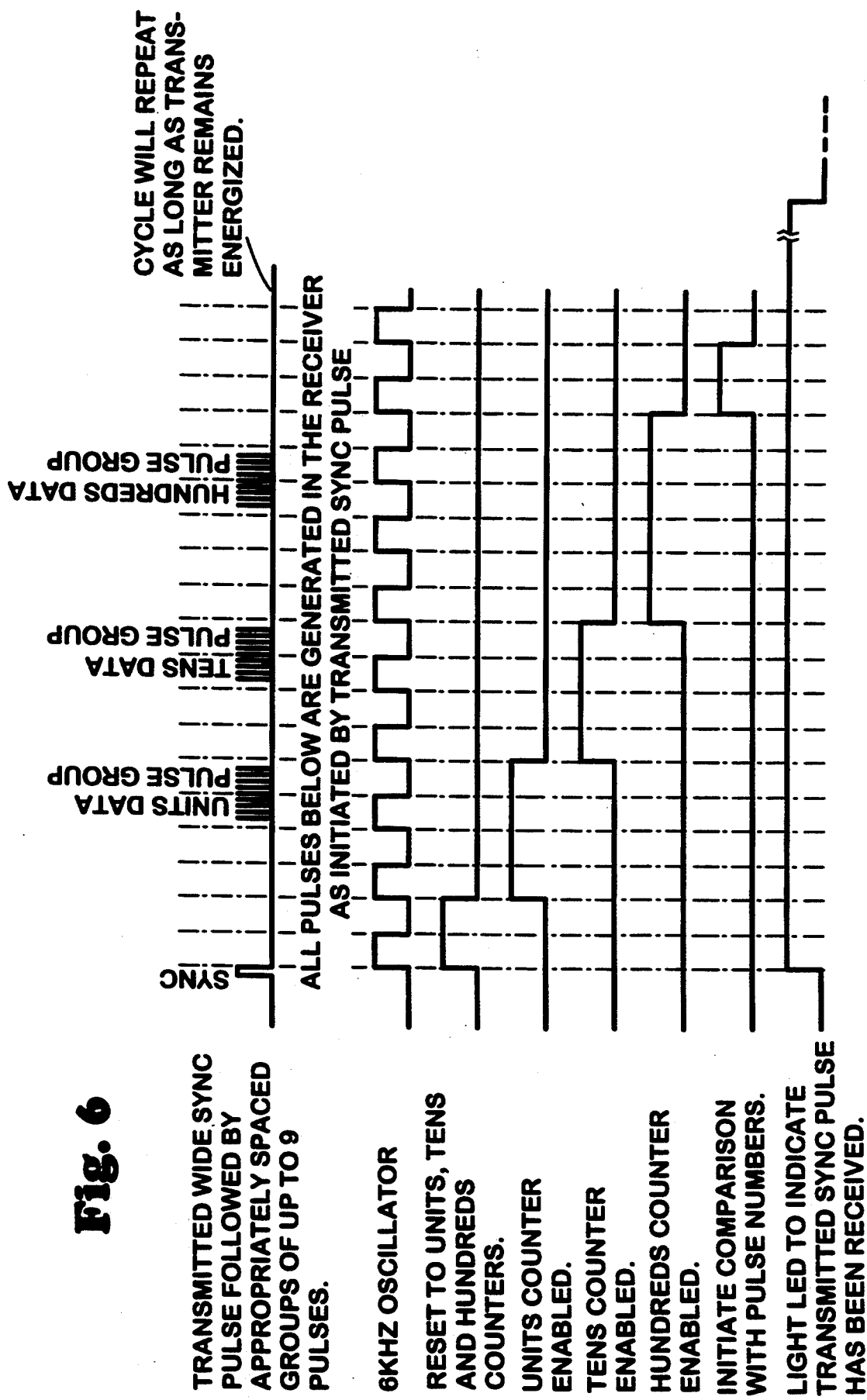

APPARATUS FOR LOCATING FILE FOLDERS

BACKGROUND OF THE INVENTION

The present invention is directed to an apparatus for locating file folders. In particular, the invention includes a portable electromagnetic transmitter for actuating a selected receiver among a plurality of file folders.

The retrieval of lost or misplaced file folders is very costly. In 1985 it was estimated to cost $135.00 to locate a lost file. The present invention is directed to an apparatus for the retrieval of a given file, among many.

While the present apparatus is useful for straight numerical or alphabetical filing systems, it is particularly useful with the terminal digit filing system where all of the filing folders having the same terminal digits are located in the same unit of filing.

For example only, if a system has one million file folders, and uses four digits in terminal digit filing, 1,000 file folders may be in the same general area of filing. If folder 1221234 is to be located, since all folders ending in "1234" are in the same general location, 122 is entered as a signal code to be transmitted and the folder equipped with a receiver tuned to the particular transmitted signal will respond, either audibly, visually or both. Such a system will speed up the cost and time involved in retrieving a lost folder.

SUMMARY

The present invention is directed to an apparatus for locating a file folder and includes a portable electromagnetic transmitter having a varied output for providing various selected coded output signals. A shelf is provided for holding a plurality of folders and a plurality of folders are positioned on the shelf. Each folder includes an electrically powered electromagnetic receiver for receiving signals from the transmitter with each receiver producing an output in response to a different coded output signal from the transmitter. Signaling means are connected to each receiver for indicating the receipt of a signal by a receiver from the transmitter thereby identifying the folder. The signal means may be a visual signal, an audible signal, or both. The output signal of the transmitter may be radio waves or infrared.

Still a further object of the present invention is wherein the shelf includes electrical power conductors and the folders include electrical contacts connected to the receiver and adapted to engage and receive power from the power conductors.

A further feature of the present invention is wherein the transmitter emits a synchronizing pulse prior to the coded pulses which actuates a blinking light to indicate a received signal. This indicates an operating system to the operator.

Other and further objects, features and advantages will be apparent from the following description of a presently preferred embodiment of the invention, given for the purpose of disclosure, and taken in conjunction with the accompanying drawings.

BRIEF DESCRIPTION OF THE DRAWINGS

FIG. 1 is a fragmentary, elevational perspective view of a folder of the present invention positioned on a shelf, FIG. 2 is an enlarged fragmentary, elevational view of the folder of FIG. 1 illustrating the receiver and its connections, FIG. 3 is a cross-sectional view taken along the line 3—3 of FIG. 1, FIG. 4 is a block diagram schematic for a transmitter of the present invention, FIG. 5 is a block diagram schematic of a receiver of the present invention, and FIG. 6 is a timing sequence showing the transmission and various receiving timing patterns.

Description of the Preferred Embodiment

Referring now to the drawings, particularly to FIGS. 1-3, a conventional shelf, generally indicated by the reference numeral 10, is shown having a plurality of partitions 12, if desired, on which are stored a plurality of file folders 14, only one of which is shown for convenience.

The folder 14 may be any size, such as letter, legal or x-ray. A plurality of such folders 14 are placed in series on a plurality of shelves 12 and grouped numerically, alphabetically, or by terminal digits.

Each folder 14 is provided with an electrically powered electromagnetic receiver 20 for receiving electromagnetic rays such as radio or infrared signals. Each receiver is individually encoded to respond, either visually such as by an LED indicator 22, or by audible signals, or both, when it receives a specific coded signal from a transmitter, which will be more fully described hereinafter, to actuate the signal means 22 to allow the particular file folder 14 to be easily found. While each individual file folder 14 may be electrically powered by individual power supplies, such as batteries, it is preferable that the shelving 10 include electrical power conductors 24 and 26 which are electrically insulated from the shelves 10 in the event that they are metal. The electrical conductors 24 and 26 run longitudinally of the shelf 10 and while both conductors may be either on the back 11 or the bottom 13 of the shelf 10, one conductor 24 is here shown positioned on the back 11 and the other conductor 26 is positioned on the bottom 13. Thus, the conductors 24 and 26 may provide a continuous power source for supplying electrical power to a multitude of file folders 14.

Each file folder 14 includes a first electrical contact 28 and a second electrical contact 30 for engaging and receiving electrical power from the electrical conductors 24 and 26, respectively, when a file folder is inserted into place on the shelf 10. The electrical contacts 28 and 30 are connected to the receiver 20 by wires 32 and 34, respectively, for transmitting the electrical power to the receiver 20. Thus, the power system shown on the shelf 10 may be conveniently turned off and on by switching means (not shown) as desired.

Referring now to FIG. 4, a hand held portable transmitter generally indicated by the reference numeral 40 is best shown having a power source 42, an off-on switch 44 which, when actuated, turns on timing pulse generator 46 which provides a short sync pulse 48, such as 0.1 millisecond to a pulse mixer 50. Generator 46 also supplies ENABLE pulses to pulse generator 52 which provides data pulses at an 80 kHz rate to pulse counters 54, 55, and 56. The pulse generator 52 also sends similar pulses to pulse mixer 50. Pulses from counters 54, 55, and 56 are applied to logic circuit 58 which is connected to selector switches 60, 61, and 62 which are a hundreds, tens, and units selector which are operated by the user of the transmitter 40 to encode the number of the file being located. The setting of the switches 60, 61 and 62 indicate a file having the terminal digits of "258". The logic circuit 58 matches the number of pulses from counters 54, 55, and 56 with the number of pulses selected by switches 60, 61 and 62 and sends a stop timing pulse 64 during each data pulse group to generator 46 which then stops the pulse generator 52. Thus, the number of pulses sent by generator 52 to pulse mixer 50 corresponds to the positions of selector switches 60, 61, and 62. Pulse mixer 50 combines sync pulse and data pulses and applies them to a driver 66 and to output 68 such as an infrared diode for transmission of sync pulse and data group pulses as selected by switches 60, 61, and 62. While the transmitter 40 as shown will transmit three groups of data pulses with up to 9 pulses in each group at the 80 kHz rate, additional switches and data pulse counters can be added to increase the terminal digit capability.

Referring now to FIG. 5, the block diagram of the receiver 20, shown in FIGS. 1-3, is best seen. The receiver 20 has an input 70 such as an infrared photo detector for receiving the output signals from the transmitter 40 of FIG. 4. The received coded signals are transmitted to an amplifier and sync separator 72 where the sync pulse alone is applied to timing pulse generator 74 which generates sequential reset and enable pulses to counters 80, 81 and 82 followed by an initiate-match pulse to match detector 84 in which the file number has been encoded. The sync pulse also actuates a 40 millisecond pulse generator 73 which is alternately turned off for 40 milliseconds by inhibit generator 75 which causes visible LED indicator 22 to blink on and off. The sync pulse will be received by many folders 14 in range of the infrared beam on the shelf and provides a check of whether the system is in proper working order. The match-indicating pulse 78 enables match detector 84 and if the incoming encoded signal from the transmitter 40 matches the number encoded in the receiver 20, the match detector 84 sends a match-detected pulse 90 to the 40 millisecond inhibit generator 75 which then cannot turn the 40 millisecond pulse generator 73 off and this results in LED 22 appearing to be lit continuously which indicates the desired file.

Referring to FIG. 6, the timing diagram for various signals is best seen. The timing diagrams indicate that each receiver 20 is individually encoded to respond only when it receives a given quantity of pulses, which are transmitted in discrete grouping and within certain relative periods. Preferably, these relative time periods are nominally the same for all receivers 20, but the quantity of pulses within one or more of the time periods is different for each encoded receiver 20. When a receiver counts the number of pulses in each group of transmitted pulse signals and when these pulses match that for which the receiver has been encoded, the receiver 20 responds by signaling, either visually, audibly or both, in order to attract the operator's attention. The coded signal will be transmitted as long as the transmission switch 44 (FIG. 4) is held closed. The synchronizing pulses will initiate the proper timing sequence within the receivers 20.

The present invention, therefore, is well adapted to carry out the objects and attain the ends and advantages mentioned as well as others inherent therein. While a presently preferred embodiment of the invention has been given, for the purpose of disclosure, numerous changes in the details of construction, will be readily apparent to those skilled in the art and which are encompassed within the spirit of the invention and the scope of the appended claims.

What is claimed is:

1. An apparatus for locating a file folder comprising,
   a portable electromagnetic transmitter having a varied output for providing various selected coded output signals,
   a shelf for holding a plurality of folders,
   a plurality of folders positioned on said shelf, each folder having an electrically powered electromagnetic receiver for receiving signals from the transmitter, each receiver providing an output in response to a different coded output signal from the transmitter,
   signaling means connected to each receiver output for indicating the receipt of signal by a receiver from the transmitter thereby identifying the folder, and
   said folder includes electrical contacts connected to the receiver, and said contacts adapted to engage and receive power from the power conductors.

2. The apparatus of claim 1 wherein the signaling means is a visual signal.

3. The apparatus of claim 1 wherein the output signal of the transmitter is infrared.

4. The apparatus of claim 1 wherein said shelf includes electrical power conductors, and
   said folder includes electrical contacts connected to the receiver, and said contacts adapted to engage and receive power from the power conductors.

5. The apparatus of claim 1 wherein said transmitter transmits in addition to the coded output a synchronizing pulse signal during each transmitted signal for actuating a said-signaling means.

6. The apparatus of claim 5 wherein the synchronizing pulse creates a visual blinking signal which is transformed into a steady light when a matching code signal is received.

7. The apparatus of claim 1 wherein the electrical power conductors on the shelf extend parallel to the longitudinal axis of the shelf.

* * * * *